United States Patent
Nichols et al.

(10) Patent No.: US 7,027,443 B2
(45) Date of Patent: Apr. 11, 2006

(54) REASSEMBLY ENGINES FOR MULTILINK APPLICATIONS

(75) Inventors: Stacy William Nichols, Ottawa (CA); Deborah Ann Frischknecht, Ottawa (CA); Alan Charles Coady, Ottawa (CA); Biniam Mesfin, Ottawa (CA)

(73) Assignee: PMC-Sierra Ltd., Burnaby (CA)

( * ) Notice: Subject to any disclaimer, the term of this patent is extended or adjusted under 35 U.S.C. 154(b) by 922 days.

(21) Appl. No.: 09/934,847

(22) Filed: Aug. 23, 2001

(65) Prior Publication Data

US 2003/0039250 A1 Feb. 27, 2003

(51) Int. Cl.
*H04L 12/28* (2006.01)
*H04L 12/56* (2006.01)

(52) U.S. Cl. .................. 370/394; 370/474; 370/476

(58) Field of Classification Search ............. 370/474, 370/449, 394, 395.4, 428, 473
See application file for complete search history.

(56) References Cited

U.S. PATENT DOCUMENTS

| | | | |
|---|---|---|---|
| 5,396,490 A | | 3/1995 | White et al. |
| 5,590,122 A | | 12/1996 | Sandorfi et al. |
| 6,188,699 B1 | | 2/2001 | Lang et al. |
| 6,310,892 B1 * | 10/2001 | Olkin | .................. 370/473 |
| 6,735,203 B1 * | 5/2004 | Heiman | .................. 370/394 |
| 6,757,248 B1 * | 6/2004 | Li et al. | .................. 370/235 |
| 6,781,992 B1 * | 8/2004 | Rana et al. | .................. 370/394 |
| 6,832,261 B1 * | 12/2004 | Westbrook et al. | ......... 709/236 |
| 6,870,850 B1 * | 3/2005 | Fichou et al. | ................ 370/400 |
| 6,891,855 B1 * | 5/2005 | Bruckman | .................. 370/468 |
| 2002/0051465 A1 * | 5/2002 | Fang et al. | ................. 370/470 |
| 2003/0035372 A1 * | 2/2003 | Schaub | ........................ 370/230 |
| 2003/0039249 A1 * | 2/2003 | Basso et al. | ................ 370/394 |

OTHER PUBLICATIONS

RFC 1661, The Point-to-Point Protocol (PPP).
RFC 1990, PPP Multilink Protocol.
RFC 2686, Multiclass Multilink PPP.
FRF.12, Frame Relay Fragmentation Implementation Agreement.
FRF.16, Multilink Frame Relay UNI/NNI Implementation Agreement.

* cited by examiner

*Primary Examiner*—Chi Pham
*Assistant Examiner*—Blanche Wong
(74) *Attorney, Agent, or Firm*—Curtis B. Behmann; Borden Ladner Gervais LLP

(57) ABSTRACT

Methods, systems, and apparatus for processing packet fragments for reassembly into packets. Datastreams containing packet fragments are received and data corresponding to different channels are segregated. For each channel, data is then aggregated to recreate packet fragments. Once the fragments are recreated, they are, if required, resequenced using a two-tier memory mapping structure where only pointers, and not the fragments, are manipulated. After resequencing fragments to reassemble the packet, the reassembled packet is dispatched to its ultimate destination. The present invention also provides a method of load balancing between multiple links when packet fragments are transmitted from a fragmenting node through a multiple link bundle.

21 Claims, 12 Drawing Sheets

| Ptr Address | Memory Address | Next Ptr |
|---|---|---|
| A | 000 | B |
| B | 031 | C |
| C | 063 | D |
| D | 095 | NULL(END) |
| E | 127 | G |
| F | 159 | UNUSED |
| G | 191 | J |
| H | 223 | I |
| I | 255 | NULL |
| J | 287 | K |
| K | 319 | NULL |

FIG. 4

| X + 5 | | | | |
|---|---|---|---|---|

| X + 5 | | | X + 2 | |
|---|---|---|---|---|

| X + 5 | X + 4 | | X + 2 | |
|---|---|---|---|---|

| X + 5 | X + 4 | X + 3 | X + 2 | |
|---|---|---|---|---|

| X + 5 | X + 4 | X + 3 | X + 2 | X + 1 |
|---|---|---|---|---|

FIG. 6

REASSEMBLY ENGINES FOR MULTILINK APPLICATIONS

FIELD OF THE INVENTION

The present invention relates to computer networking and, more specifically, to applications which use multiple links between nodes as a single link.

BACKGROUND TO THE INVENTION

The explosion of interest and reliance on the Internet has led to an increasing demand for increased data carrying capacity in networks. The nigh ubiquitous T1 standard is beginning to show its inadequacies for some applications. Unfortunately, users who need more than the T1's 1.544 mbps capacity used to have no recourse but to upgrade to the T3 standard operating at 44.736 mbps. This jump can be inconvenient for users who are only willing to pay for, at most, 20–30 mbps. One solution to the problem was the concept of "bundling" multiple T1 lines to arrive at higher speeds and capacities. This solution essentially involves aggregating multiple T1 lines or links and using them as a single link from the perspective of providing bandwidth.

While the "bundling" solution seemed to solve the problem theoretically, technical issues arose when implementing the solution. To optimize the bandwidth in the multiple link bundle, multiple link protocols (such as FRF.12/16 and RFC 1990/2686) were developed. These protocols called for dividing or fragmenting packets (units of data sent from one network node to another) into smaller elements. These fragments are then transferred across the multiple links simultaneously. This maximizes the link bandwidth available.

As an example, if a single packet takes x units of time to transfer over a single link, it should theoretically be possible to divide the packet into 5 smaller elements and transmit these five elements over 5 identical links. Such a transmissions should only take x/5 units of time. Of course, the above example ignores the overhead cost of fragmenting and, later on, reassembling the packet. It is this reassembly problem that can provide the most issues in implementing the "bundling" solution. Essentially, the system which implements the link bundling solution must:

1) transmit packets across the member links in the multiple link bundle;
2) fragment the packets while transmitting across the bundle to reduce skew and delay for packet transfers;
3) support multiple simultaneous fragmentation sessions; (this is needed to support multiple independent multiple link bundles and also multiple independent multiple link sessions within a single bundle); and
4) receive data from all the links, reassemble the data into fragments, and then into packets.

Current solutions for the reassembly problem have their own drawbacks. U.S. Pat. No. 5,590,122 issued to Sandorfi et al and U.S. Pat. No. 5,396,490 issued to White et al have proposed solutions directed at packet reassembly but they do not specifically address multiple link applications. Other solutions suffer from the following drawbacks:
a) a low number of bundles supported due to the processing requirements of the bundle reassembly;
b) supporting only a single reassembly session per bundle;
c) supporting a small number of aggregate bundles due to processing and memory limitations;
d) an assumption that all links operate at the same speed to simplify the processing; and
e) line rate processing of all small packets is often limited to the overhead associated with processing each packet.

From the above, there is therefore a need for a solution that can, among other things, support multiple reassembly sessions, support large numbers of bundles and a large number of channels within those bundles, and also be transparent to differing link speeds.

SUMMARY OF THE INVENTION

The present invention overcomes the deficiencies of the prior art by providing methods, systems, and apparatus for processing packet fragments received for example from a bundle of links for reassembly into packets. Datastreams containing packet fragments are received and data corresponding to different channels are segregated. For each channel, data is then aggregated to recreate packet fragments. Once the fragments are recreated, they are, if required, resequenced using a two-tier memory mapping structure where only pointers, and not the fragments, are manipulated. After resequencing fragments to reassemble the packet, the reassembled packet is dispatched to its ultimate destination. The present invention also provides a method of load balancing between multiple links when packet fragments are transmitted from a fragmenting node through a multiple link bundle.

In a first aspect, the present invention provides a method of reordering packet fragments, said packet fragments being derived from a packet which has been divided into at least two fragments, each of said at least two fragments having a sequence number denoting a position in a proper sequence for correct ordering of each fragment for a reassembly of said packet, each fragment being represented by a head pointer, the method comprising:
 a) receiving a received head pointer for a received fragment;
 b) determining a sequence number for said received fragment;
 c) determining a first slot position for said received head pointer in a first tier pointer array, said first slot position being determined by the sequence number for said received fragment, said first slot position having a tier pointer pointing to a second tier pointer array;
 d) determining a second slot position for said received head pointer in the second tier pointer array, said second slot position being determined by the sequence number for said received fragments;
 e) placing said head pointer in said second slot position; and
 f) repeating steps a)–e) until a sequence of received head pointers stored in said second tier array indicates a complete sequence, wherein a complete sequence is a sequence of head pointers that does not have a gap and includes a fragment that is an end fragment for said packet.

In a second aspect, the present invention provides a method of reordering packet fragments, said packet fragments being derived from a packet which has been divided into at least two fragments, each fragment having a sequence number denoting a position in a proper sequence for correct ordering of each fragment for a reassembly of said packet, each fragment being represented by a head pointer, the method comprising:
 a) receiving a received head pointer for a received fragment;

b) determining a sequence number for said received fragment;
c) determining a slot position for said received head pointer in a pointer array, said slot position being determined by the sequence number for said received fragments;
d) placing said head pointer in said slot position;
e) repeating steps a)–d) until a sequence of received head pointers stored in said array indicates a complete sequence, wherein a complete sequence is a sequence of head pointers that does not have a gap and includes a fragment that is an end fragment for said packet.

In a third aspect, the present invention provides a method of resequencing fragments forming portions of a data packet into a proper sequence for a reassembly of said packet, each fragment having a sequence number denoting a proper placement of said fragment in said reassembly, the method comprising:
a) receiving a received head pointer for a received fragment, said head pointer representing said received fragment;
b) determining a reassembly session number for said received fragment, said reassembly session number denoting a home packet of which said received fragment is a part;
c) determining if said home packet of which said received fragment is a part is currently being reassembled;
d) if said home packet is currently being reassembled, determining which pointer array is being used in a reassembly of said home packet and placing said head pointer in said pointer array;
e) if said home packet is not currently being reassembled, initiating a reassembly of said home packet by allocating a pointer array for said reassembly of said home packet;
f) determining a slot position for said head pointer in said pointer array, said slot position being determined by the number for said received fragment;
g) placing said head pointer in said slot position; and
h) repeating steps a)–g) until a sequence of received head pointers stored in said array indicates a complete sequence, wherein a complete sequence is a sequence of head pointers that does not have a gap and includes a fragment that is an end fragment for said packet.

In a fourth aspect, the present invention provides a method of processing data frames in a multiple channel system, said data frames containing a payload, said payload comprising portions of a larger data transmission unit, the method comprising:
a) receiving a data frame;
b) determining with which channel said data frame is associated;
c) extracting a payload of said data frame;
d) storing said payload at a memory location specifically associated with said channel;
e) if previous payloads already stored at said memory location, appending said payload to said previous payloads; and
f) repeating steps a)–e) until a specific condition is met, said specific condition being chosen from the group comprising:
an amount of data stored in said memory location reaches a predetermined value; and
a payload received and data stored in said memory location relate to different data transmission units.

In a fifth aspect, the present invention provides a method of rebuilding fragments each of said fragments being a data transmission unit having as payload a portion of data packet, said method comprising:
a) receiving a first chunk of data comprising a first segment of a fragment;
b) storing said chunk of data in a first block of memory;
c) receiving a second chunk of data comprising a second segment of said fragment;
d) placing said second chunk of data in a second block of memory contiguous to said first block of memory;
e) linking said second contiguous block of memory with said first contiguous block of memory; and
f) repeating steps a)–e) until said fragment is complete, wherein said first chunk and said second chunk are received in a sequence which preserves a data integrity of said fragment.

In a sixth aspect, the present invention provides a fragment for use in transmitting data between two nodes in a network, said fragments having:
payload comprising a portion of a data packet;
a sequence number denoting a proper placement of said fragment in a sequence of fragments when said data packet is being reassembled, and
a reassembly session number identifying which data packet said fragment is a part of.

In a seventh aspect, the present invention provides a packet for use in transmitting data between two nodes in a network, and for use in a multiple link data transmission system, said packet having a connection identifier denoting to which grouped of links said packet belongs to.

In an eighth aspect, the present invention provides a system for rebuilding fragments each of said fragments being a data transmission unit having as a payload a portion of data packet, the system comprising:
a memory bank for storing data chunks, each data chunk being a portion of a fragment;
a linked list pointer table, said pointer table having a record of which specific memory locations in said memory bank are used by specific data chunks wherein each data chunk relating to a specific fragment is stored in a specific memory location, an address of such specific memory location being placed in said pointer table and linked to addresses of previously stored data chunks.

In a ninth aspect, the present invention provides a system for resequencing fragments forming portions of a data packet, each of said fragments having a sequence number denoting a proper placement of said fragment in said packet and each of said fragments having a reassembly session number denoting a home packet of which said fragment is a part, the system comprising:
at least one pointer array for each resequencing operation for storing head pointers, each head pointer representing a received fragment, each head pointer being associated with a slot in one of said pointer arrays based on the sequence number of a fragment represented by said head pointer; and
a lookup engine for determining if a fragment represented by a head pointer has a reassembly session number matching a resequencing operation being performed, wherein in the event a fragment has a reassembly session number matching a resequencing operation being performed, its head pointer is placed in a pointer array for said resequencing operation.

In a tenth aspect, the present invention provides a system for processing data frames in a multiple channel data transmission system, said data frames containing a payload, said payload comprising portions of a larger data transmission unit, the system comprising:
 a data frame engine for extracting a payload from said data frames;
 a partial packet processor for storing payloads extracted from said data frames;
 an internal memory bank controlled by said processor such that said payloads are stored in said memory bank, wherein
a specific memory location in said memory bank is allocated for each channel such that payloads from a specific channel are stored in said memory location.

In an eleventh aspect, the present invention provides a method of selecting a link on which to transmit data in a multiple link system, the method comprising:
 a) determining an amount of data queued for transmission on each link in said multiple link system;
 b) determining which link in said multiple link system has the most data queued for transmission;
 c) selecting a link with a least amount of data queued for transmission as the link on which to transmit data; and
 d) if all links in said multiple link system have equal amounts of data queued for transmission, selecting each link in sequence as the link on which to transmit data.

In a twelfth aspect, the present invention provides a multiple stage system for processing data stream on a multiple link system, said system comprising:
 a first stage for receiving data frames and extracting and storing payloads from said data frames;
 a second stage for rebuilding fragments from said payloads of said data frames; and
 a third stage for resequencing said fragments for eventual retransmission to a high speed data link,
wherein
each of said fragments forms a portion of a data packet, each of said fragments having a sequence number denoting a proper placement of said fragment in said reassembly and each of said fragments having a reassembly session number denoting a home packet of which said fragment is a part.

BRIEF DESCRIPTION OF THE DRAWINGS

A better understanding of the invention may be obtained by reading the detailed description of the invention below, in conjunction with the following drawings, in which:
FIG. 4 illustrates a sample pointer table which may be used in a data storage scheme according to the invention;
FIG. 6 illustrates a second tier array and how it is populated by a sequence of fragments arriving out of order.

DETAILED DESCRIPTION

To clarify the following description, a brief description of the process executed on a packet to be sent on a multiple link bundle system will be described. It should be noted that a multiple link bundle is a collection of data links between two nodes with the links being collectively used to increase bandwidth by utilizing them as if they were a single link.

Figure 1:
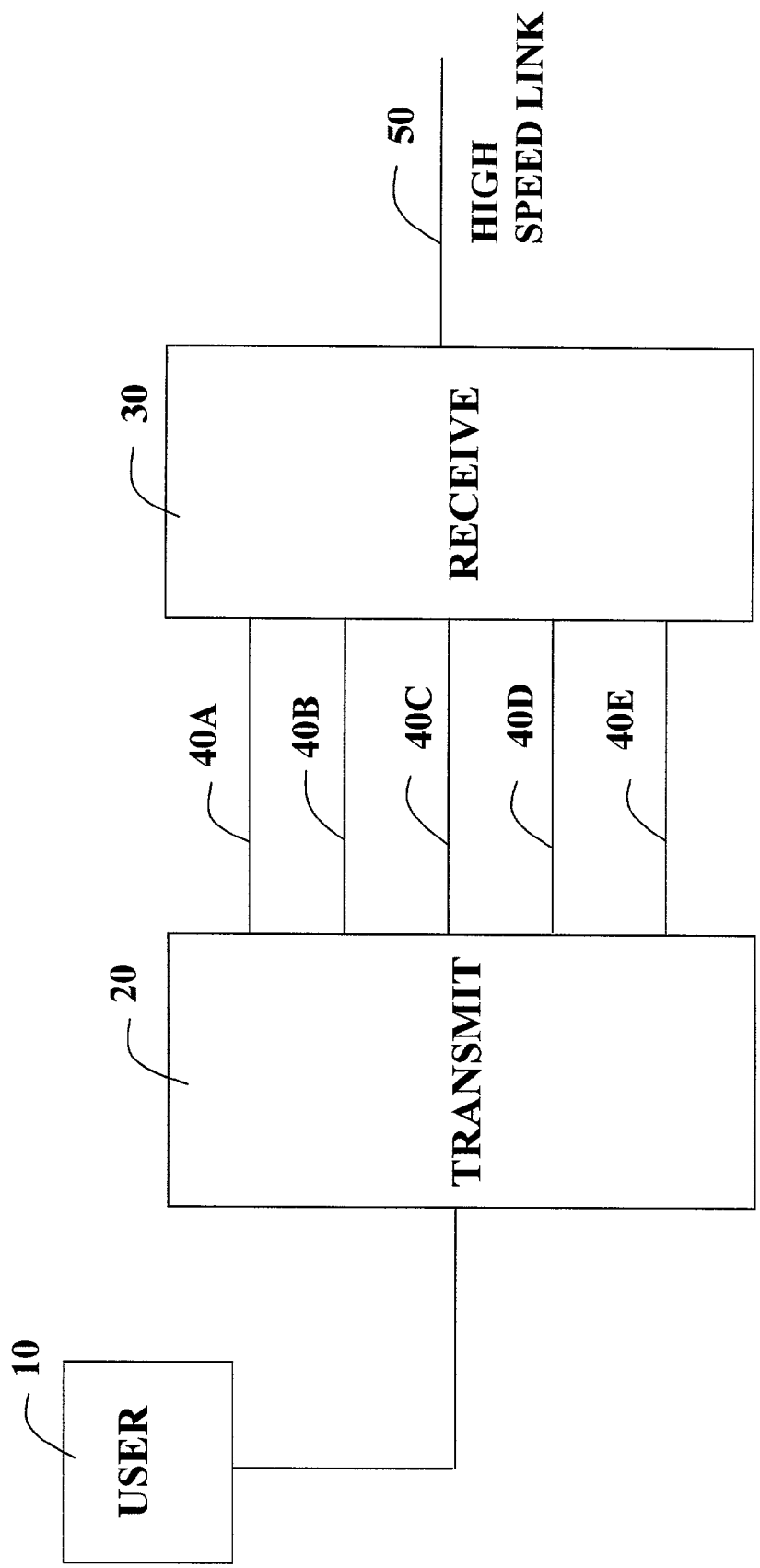
FIG. 1 is a block diagram of a multiple link data transmission system.

Refenlng to FIG. 1, a user 10 is connected to a transmh node 20. The transmit node 20 is connected to receive node 30 by way of "low speed" links 40A, 40B, 40C, 40D, 40E. The receive node 30 is coupled to a high speed link 50. It should be noted that the terms "high speed" and "low speed" are relative to each other and are only used for illustration purposes. Thus, each of the links 40A, 40B, 40C, 40D, 40E can be T1 lines transmitting at 1.544 mbps while the link 50 can be a T3 line operating at around 45 mbps. It should be noted that while T1 lines are used in this example, other types and speeds of links may be used.

In operation, the bundling solution works thus: the user 10 transmits a packet for eventual transmission on the link 50. The packet is received by the transmit node 20 and is divided into fragments. These fragments can then be independently transmitted via lines 40A, 40B, 40C, 40D, 40E to the receive node 30. The receive node 30 then reassembles the received fragments to recreate the original packet This original packet is then transmitted through the link 50 to its eventual destination.

The fragmentation process that the packet undergoes and the resulting fragments are generally compliant with existing standards such as RFC 1990 and FRF 12/16.

Figure 2:
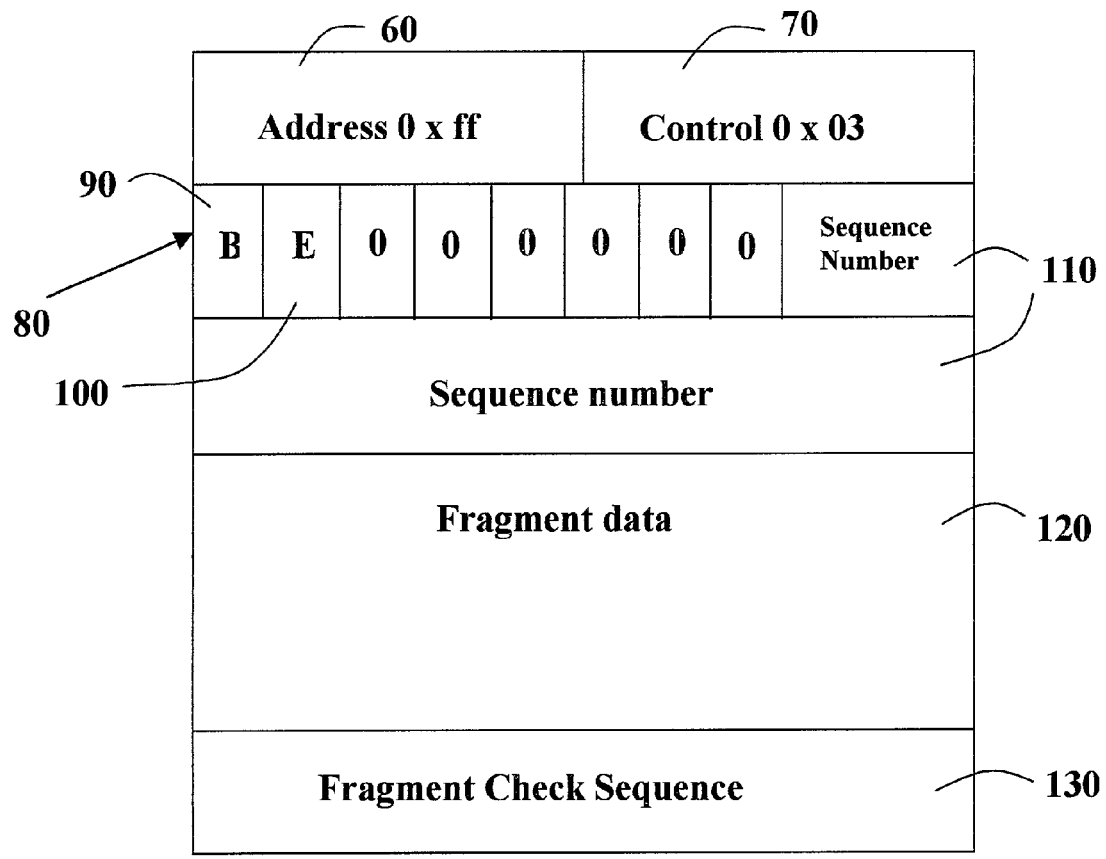
FIG. 2 illustrates one format for fragment encapsulation.

Each portion of the fragmented packet is encapsulated within a specific encapsulation format, the packet fragment data being bracketed by fragment identification data. Each fragment transmitted by the transmit node 20 is given a unique sequence number such that fragments resulting from a packet will have consecutive sequence numbers part of the fragment identification data, a fragment may also have an ending fragment bit set. Such a fragment denotes the ending fragment or the last fragment in a sequence for a particular packet. Thus, if a packet was fragmented into fragments with sequence numbers a, a+1, a+2, a+3, then fragment a+3 would have its ending fragment bit set as it is the final fragment for a particular packet. One possible format for the fragment encapsulation is illustrated in FIG. 2. The encapsulation format could include an address file 60 to denote the destination address of the fragment, a control field 70, an MP (multilink protocol) header field 80 which can include a beginning fragment bit 90 and an ending fragment bit 100. Also included in the format would be the sequence number 110, the payload 120 or the actual portion of the packet, and an FCS (Frame Check Sequence) field 130 for error correction purposes. In this specification the term "fragment" will be taken to mean an encapsulated portion of a packet that has been divided or fragmented into separate portions. The term "portion" will be taken to mean a section or part of a packet. Thus, a fragment will carry within it a portion of a packet. To further illustrate the concept, the fragment is analogous to an egg while the portion will be analogous to the egg yolk within the egg.

While not defined in the generally accepted standards for multiple link applications, a header field in each fragment would be quite useful in resolving the problems associated with multiple link bundling. Such a header field, perhaps taking the place of the control field 70 in FIG. 2, would include a reassembly session number. This reassembly session number identifies a reassembly session for a particular packet. This number can be assigned to a fragment when a packet is fragmented or divided. Thus packet A can be assigned reassembly session number y and be fragmented into a portions carried by fragments having sequence numbers f1, f2, f3, and f4. Packet B, on the other hand, can be assigned the unique reassembly session number z and be fragmented into portions carried by fragments with sequence numbers f5, f6, f7, f8, f9, and f10. Reassembly of these two packets can therefore be simplified as it should now be clear that fragments belonging to packet A will have a reassembly session number y and that the proper sequencing of the portions carried by these fragments is f1, f2, f3, and f4. Similar logic can be applied to packet B when retrieving and resequencing its fragments.

As an important side note, it must be mentioned that not all packets need to be fragmented or divided. Some packets are of sufficiently small size that they can properly fit as payload for an encapsulated fragment. Clearly, such packets, when received by the receive node 30, need not be resequenced nor reassembled.

Figure 2A:
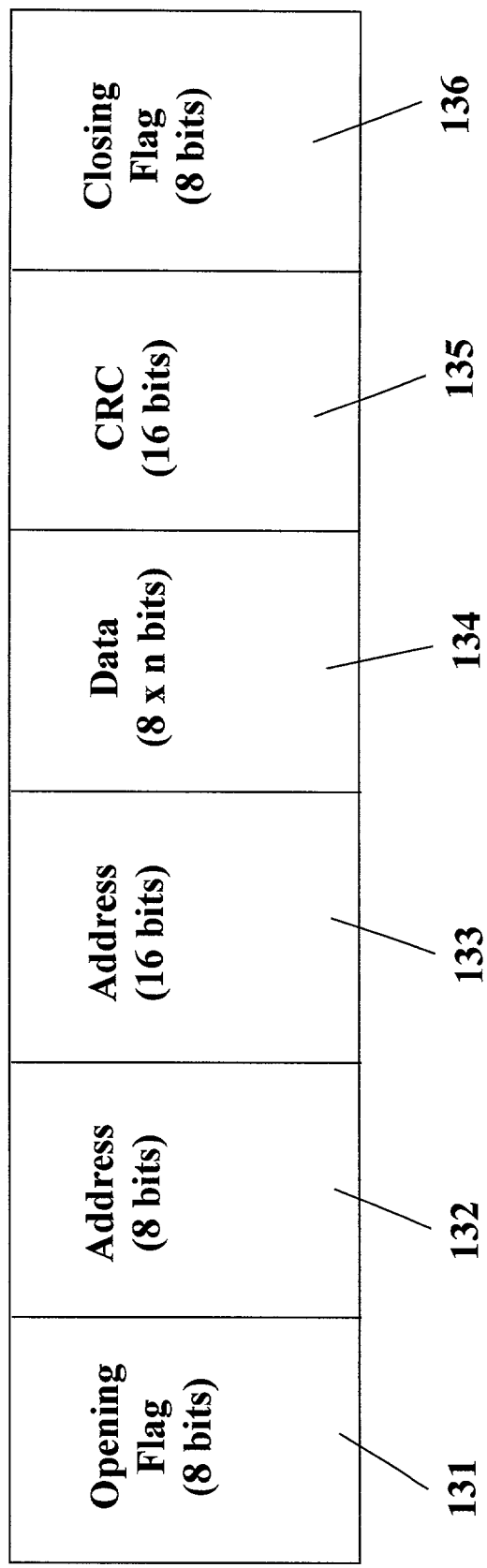
FIG. 2A illustrates a format for an HDLC frame.

For the actual data transfer between the transmit node 20 and the receive node 30, data is transferred using bit streams. A bitstream can carry multiple channels and, to separate the data between channels, the HDLC (High Level Data Link Control) protocol is commonly used. This protocol provides a separate frame for each channel's data. The frame delineates the beginning and the end in the bitstream for a channel's transmission. A standard HDLC frame may have a format as illustrated in FIG. 2A. An opening flag field 131 denotes the beginning of the frame while an address field 132 denotes the destination of the frame. An extra address field 133 may be present, depending on the implementation of the protocol. A data section 134 will contain the data or payload of the frame while a CRC (Cyclic Redundancy Check) field 135 is present for error checking purposes. Finally, a closing flag field 136 delineates the end of the frame.

Depending on the implementation of the protocol, the data field in the HDLC frame may contain a fragment or a packet. As an example of how the transmit side may work, packet A is to be transmitted. Packet A will thus be divided into, for example, 3 portions corresponding to fragments with sequence numbers f1, f2, f3. Each fragment may be placed into a single HDLC frame and transferred down a given link.

The sequence of these frames is preserved as each frame sequence, denoting a fragment, is dedicated to a single channel. Each channel is dedicated to a single physical link. Using this scheme, each HDLC frame sequence is transmitted in sequence and, hence, the ordering of the fragment portions is preserved.

Figure 3:
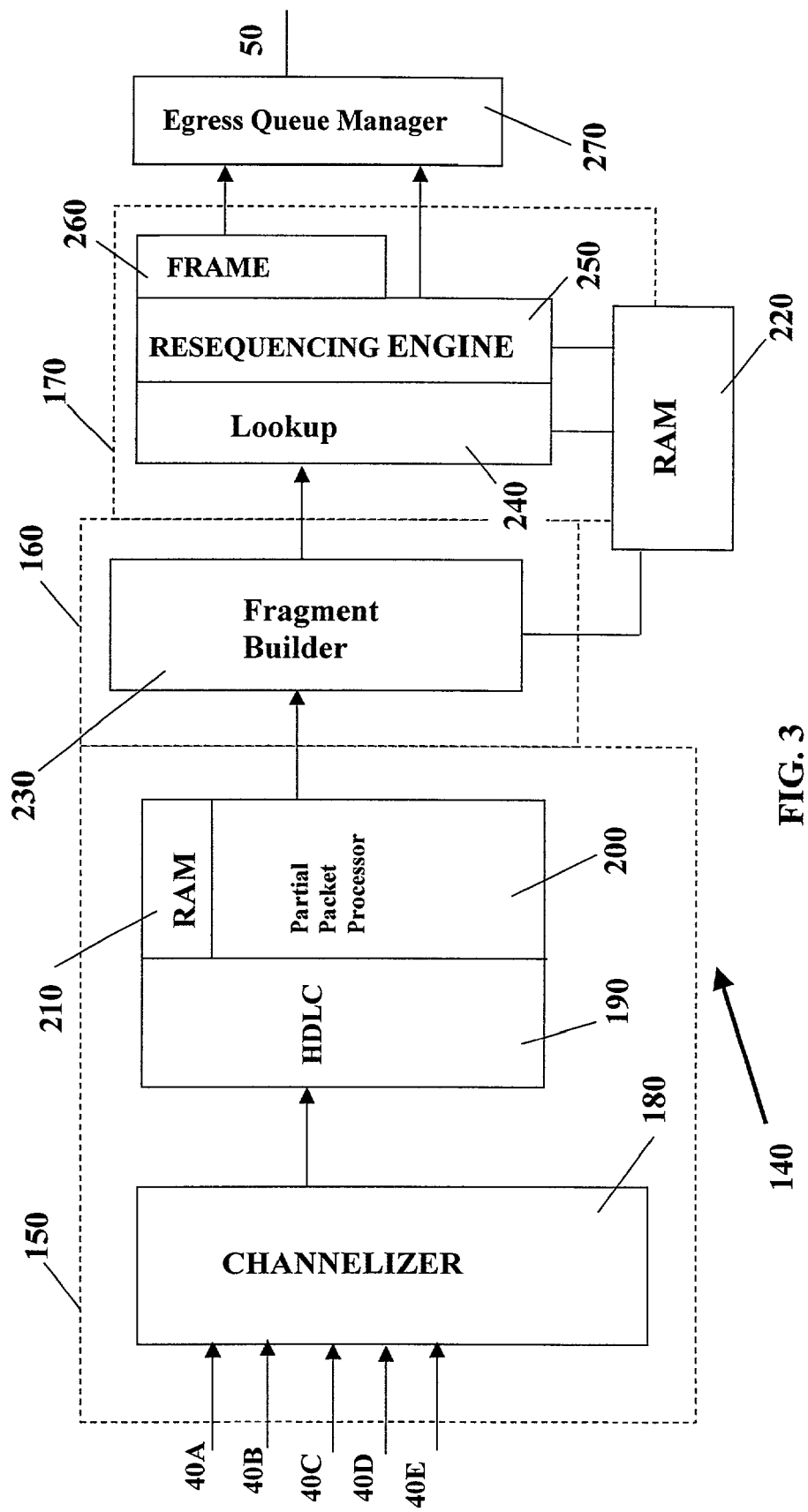
FIG. 3 is a block diagram of the internal components of the receive node of FIG. 1.

Referring to FIG. 3, a block diagram of the internal components of the receive node 30 is illustrated. For ease of reference and explanation, this system 140 is divided into 3 sections: a receive/chunk retrieval section 150, a fragment rebuilding section 160, and a fragment resequencing/packet reassembly section 170.

The receive/chunk retrieval section 150 receives the bitstream of the different links 40A, 40B, 40C, 40D, 40E at a channelizer 180. The channelizer 180 separates the channel in the bitstream and passes the channelized bitstream to the HDLC engine 190. The channelizer 180 associates the data in the bitstream with a particular channel. For each link, this is done by a serial to parallel conversion as serial data from the bitstream is parallelized by associating it with a particular HDLC channel. The HDLC engine examines each channelized bitstream and determines the beginning and end of each HDLC frame. Bit de-stuffing, error checking, and minimum/maximum size checking is performed by the HDLC engine 190. The payload or data carried by each HDLC frame, along with address and status information for that data, is passed by the HDLC engine 190 to the partial packet processor 200. The partial packet processor 200 controls a relatively small amount of RAM (random access memory) 210 that is preferably of the SRAM (static random access memory) type. This provides speed to the system. This RAM is used as a temporary storage or a gathering area for data received for each HDLC channel.

Within this RAM 210, sections are associated for each HDLC channel and it is within these sections that data from the associated channel is temporarily stored up to a certain amount. Once this threshold amount is reached, the data is transferred to another, larger RAM bank for use by the next section, the fragment rebuilding section 160.

In one implementation, the RAM 210 used by the partial packet processor 200 is comprised of 64 kb of SRAM. Data associated with an HDLC channel is written to a location in the SRAM that is associated with that channel. Further data from that channel is aggregated with previously received data until a threshold, in this case 32 bytes, is reached. It should be noted that within this threshold (a "chunk" of data) data from different fragments or packets are not commingled. This commingling is prevented by using a flag that is present at the tail end of an HDLC frame sequence. The flag, when encountered, denotes that the HDLC frame having the flag set is the last in the sequence and, hence, that the next HDLC frame belongs to another sequence.

The fragment rebuilding section 160 controls another memory bank 220. The fragment rebuilding section 160 receives chunks of data from the partial packet processor 200 and stores these in its RAM bank 220. Fragments that have been divided for transport between the transmit node 20 and the receive node 30 are rebuilt in this section. The fragment rebuilding section has logic which examines the data in the received chunks and recognizes the beginning and the end sections of a fragment. One method of accomplishing this is by having a set fragment size. The beginning section is easy to find as it contains the fragment headers. Once this section has been received, a running total of the accumulated fragment sections for a given fragment will provide the size of the fragment. Once the set fragment size is reached, the fragment is considered complete. Alternatively, a flag may be set in the final fragment section to denote that a fragment has been completed.

Regarding the data storage in the RAM bank 220, a linked list of chunks received for a particular fragment provides a simple yet efficient data structure. As an example, a pointer table can be used to keep track of the chunks received and to which fragment a specific chunk belongs. Since data is received in chunks of fixed size from the partial packet processor, the RAM bank 220 can be delineated into sections having the same size as a chunk and a pointer table denoting the beginning memory address for a memory section can be used. The memory accesses, when required, need only determine the beginning address of a chunk in RAM bank 220 and read from that beginning address to beginning address+chunk_size. Any new chunk of data can be added to the existing linked list by appending its pointer to the tail of a linked list. FIG. 4 illustrates such a pointer table.

Referring to FIG. 4, a pointer table which may be used in the above scheme is illustrated. As can be seen, the first column has pointer addresses while the second column has the beginning memory addresses for each chunk of data. The final column has the addresses of the next pointer in the linked list. To illustrate how the scheme may be used, we can assume that Pointer A is unused. An incoming chunk (assumed to be a beginning section of a fragment) is thus stored in the memory area beginning with memory address 000 pointed to by Pointer A. Assuming a second chunk of data for the same fragment is now received, this chunk may be placed at the memory area pointed by Pointer B. Thus, in the third column for Pointer A, the pointer address for Pointer B is entered. The result is a two element linked list with the memory area of Pointer A linked with the memory area of Pointer B. Once a final section for a fragment is received and placed in the list, there can be no link after the last chunk. Thus, the third column for that pointer/chunk would have a terminator (perhaps a null) to denote a fragment end. If a pointer's memory area is unused, the third column for that pointer would indicate its unused or free state.

Again referring to FIG. 4, it can be seen that there are three linked lists represented in the table. The first list comprises (in order) Ptr A→Ptr B→Ptr C→Ptr D (end). The second list comprises (in order) Ptr E→Ptr G→Ptr J→Ptr K (end). The third list comprises (in order): Ptr H→Ptr I (end).

Referring to FIG. 3, it should be noted that the fragment rebuilder 230 also works on a channelized basis. This means that the fragment rebuilder 230 can only work on one fragment or job per channel. For the example illustrated in FIG. 4, it should be clear that each of the completed fragments is from a different channel to currently coexist within the control of the fragment rebuilder section 160.

Once a fragment is completed by the fragment rebuilder 230, control of that fragment (i.e. the header for that fragment, its status and information regarding it, and the first pointer for the fragment) is passed to the fragment resequencing/packet reassembly section 170. This section gathers the data and the pointers for the different fragments and reassembles the packets from the fragments. This section also recognizes and processes packets that have not been fragmented. The resequencing/packet reassembly section also 170 can be comprised of a header lookup module 240, a resequencing module 250, and a frame/packet rebuild module 260.

The header lookup module 240 deals with the header field of each received fragment. This header field, briefly explained above, identifies the reassembly session, the sequence number, and an end bit for each fragment. As noted above, each reassembly session number uniquely identifies a packet that has been fragmented. When a fragment arrives at the lookup module 240, the reassembly session number is checked against packet reassembly sessions that are in operation. If the reassembly session number is new and resequencing is required, a reassembly session is initiated and resources are allocated to this session. If the reassembly session is not new, then the fragment is directed to the session to which the fragment belongs in the resequencing module.

It should be noted that the transfer of a fragment from the fragment rebuilder 230 to the lookup module 240 is simply a matter of sending the head pointer or first pointer of a fragment's linked list to the lookup module. For the lookup module to read the header in the fragment (usually the first few bytes of a fragment), the lookup module merely retrieves the first few bytes of the fragment using the head or first pointer for that fragment. The actual data of the fragment stays within the RAM bank 220. Only the pointer to that data is sent to the lookup module.

At this point it must be noted that the operation and components of the system heretofore described depends on the protocol used by the high speed link 50 illustrated in FIG. 1. If the link 50 is packet or frame based, then the frame/packet builder 260 is active and receives the output of the resequencing module 250. This frame/packet builder then sends its output (properly reconstructed packets or frames as needed) to the ingress queue manager 270. This ingress queue manager 270 manages queue for the link 50. If, on the other hand, the link 50 is not packet based and is merely a conduit transmitting a data stream of fragments, then the output of the resequencing module 250 is directly fed to the ingress queue manager 270. In this case, the output of the resequencing module 250 would be a correctly sequenced stream of fragments.

To further explain the process executed by the resequencing module 250, it must be recalled that each fragment transmitted from the transmit mode 20 is assigned a unique and increasing sequence number. This sequence number and the reassembly session number assigned to each packet determine if resequencing is required. Since sequence numbers are sequential and increasing, the resequencing module 250 expects a specific sequence number from the lookup module 240. If an incoming fragment has the expected sequence number, then no resequencing is required as the resequencing module 250 is receiving the fragments in the same sequence that the transmit node has transmitted them. Such a fragment would thus be directed to the next stage, either the packet/frame builder 260 or the ingress queue manager 270. If, on the other hand, the incoming fragment had a sequence number which did not match the expected sequence number, then reassembly would be required. If this offending fragment had a reassembly number matching a reassembly session in progress, then the fragment is directed to that reassembly session. If the reassembly session number is new, then a new reassembly session is initiated and resources are allocated.

Figure 5:
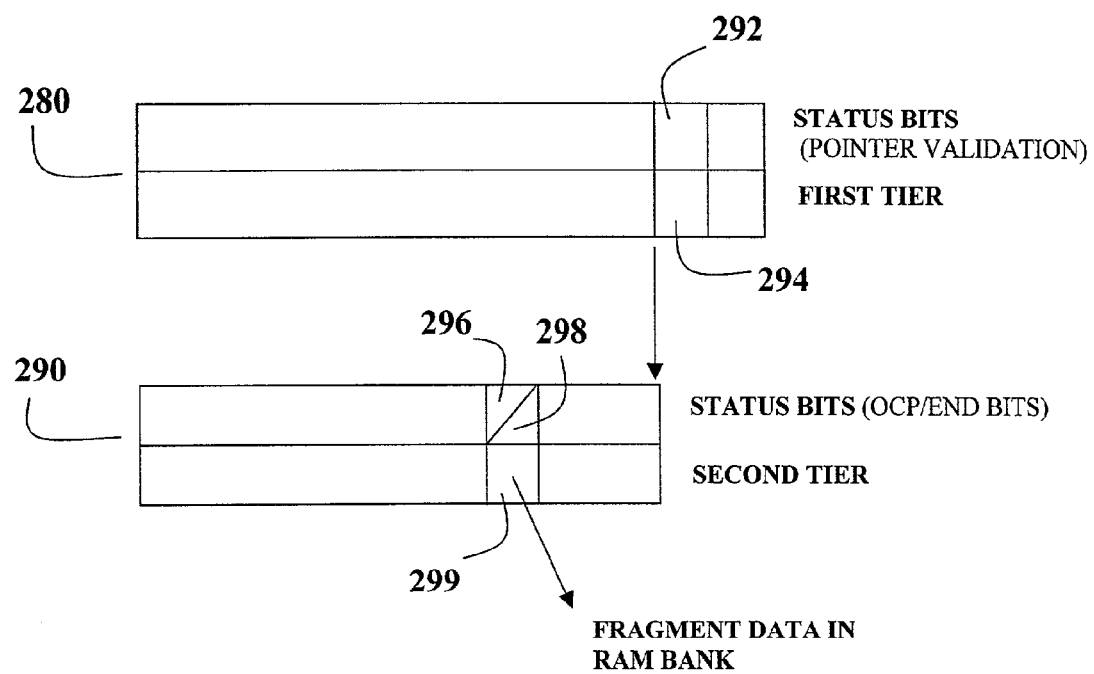
FIG. 5 illustrates a two tier data structure according to the invention.

Once the resequencing module 250 determines that resequencing is required, the fragment is enqueued for resequencing. The enqueue process used for resequencing uses a two-tiered data structure to allow the handling of large numbers of fragments. This data structure is illustrated schematically in FIG. 5. Both the first tier 280 and the second tier 290 in the data structure are arrays of pointers with status bits. The first tier 280 is an array of pointers with each pointer pointing to a second tier array of pointers. The second tier 290 array has entries that are head pointers or the first pointers in the linked list of pointers for a fragment. The placement of a head pointer for a fragment depends on the sequence number for that fragment. In one implementation the placement in the first tier for a fragment is determined by applying the formula:

$$location\_1 = channel\_offset + (seq\ \#-head\_seq\ \#)/128$$

where channel_offset is a given offset value to segregate channels

Seq # is the sequence number for the fragment head_seq # is the sequence number for the fragment that begins the sequence for a specific packet reassembly session, alternatively, this can be the expected sequence number.

Similarly, the placement of a fragment in the second tier can use the formula:

Location 2=channel_offset+(seq #−head_seq. #>>7)

Each first tier entry has, as a minimum, a pointer validation bit 292 and a pointer 294 to a second tier array. The pointer validation bit 292 is set if the pointer 294 to the second tier array is a valid pointer. For each secondary tier entry, two extra bits are added to the memory address of the head of the fragment linked list. These two bits are the OCCUPIED bit 296 and the END bit 298. The OCCUPIED bit 296 is set if the second tier entry is occupied by a valid memory address for a head pointer 299 of a fragment linked list. The END bit 298 is set if the fragment referenced by the second tier entry is an end fragment of a packet. Whether the fragment is an end bit can easily be found by examining the header of that fragment as an end bit exists under the RFC 1990 protocol (see above discussion on the fragment format).

As an example of the above scheme, we can assume that a fragment having the following header values has arrived at the resequencing module:

Sequence #: 015
Head Pointer: A
End bit value: 0
Re-Assembly Session #: 101

If we further assume that the expected sequence number is 010, the reassembly module will see that the fragment does not have the expected sequence number. If we assume that the reassembly session number 101 is currently in progress, then the reassembly module will retrieve the tier pointer arrays for that reassembly session. If we further assume that a previously received fragment with sequence number 013 has been received, then this fragment will have its head pointer in the retrieved second tier pointer array. The recently received fragment will thus be placed in the second tier array two locations away from the fragment with the sequence number 013. For the recently received fragment, the occupied bit is to be set while the end bit is not. In the address portion of the entry, the value of A is to be placed.

It should be noted that fragments may arrive out of order and the last fragment of a packet, a fragment with its end bit set, may not be the last fragment received for a packet. It is specifically for such instances that the resequencing module rearranges the fragments so that their proper order may be restored. Basically, fragments arriving out of order are slotted into their proper locations and, when the proper sequence is restored, the group of fragments may be dispatched to the next module.

Figure 6:
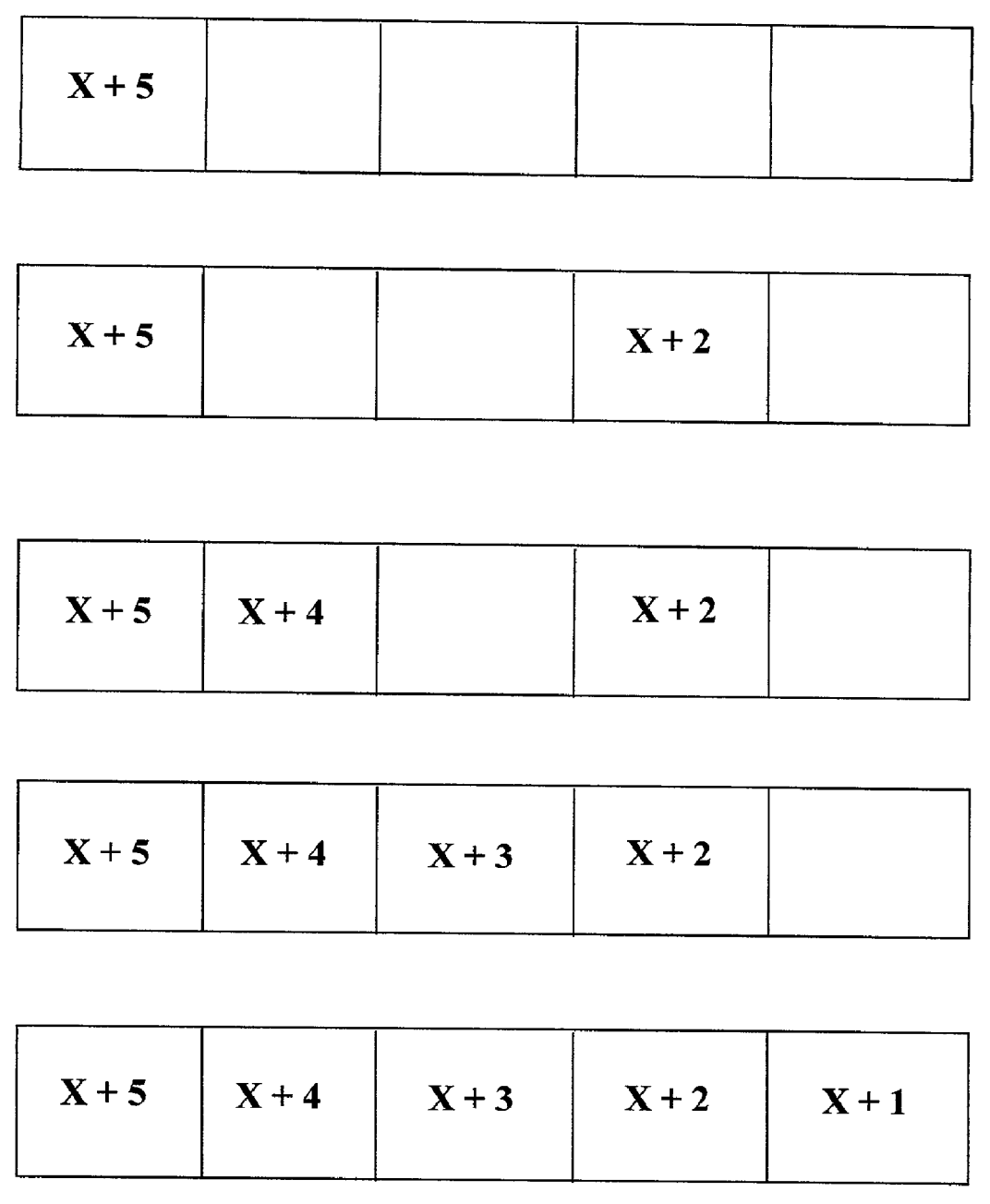

To illustrate the above, FIG. 6 illustrates a sequence of fragments arriving out of order and being reordered. For the figure, the expected sequence number is x and the fragment arrival sequence (using the fragment sequence numbers) is thus: x+5(END fragment), x+2, x+4, x+3, x+1, x. As can be seen in FIG. 6, the pointer array is gradually being populated by the arriving fragments. As noted above, the placement of a fragment is determined by a fragment's sequence number. Using the formula given above for second tier placement, the fragment with sequence number x+5 is placed in the 5$^{th}$ slot of the array. The second arriving fragment (having a sequence number of x+2) is placed in the second slot of the array.

Similarly, the other arriving fragments are in turn slotted into their proper slot in the second tier array. The bottom illustration of FIG. 6 shows that the section of the packet is complete as the fragments have been resequenced. Once all the fragments are in place, including the fragment with the END bit set, the segment is complete and ready for dispatch to the next stage. It should be recalled that the expected sequence number is x. Once the segment is complete, and after the expected sequence number arrives, then the segment can be dispatched. After the fragment with the sequence number x is received, the next expected number is x+1. Since this fragment is in a completed segment, then this segment can be dispatched.

As a criteria for completeness, a collection of resequenced fragments must be in order and be valid. This is determined by merely checking the status bits of the second tier array for a particular resequencing operation. All the OCCUPIED bits must be set for all the fragments in the sequence and the final fragment in the sequence must have its END bit set. With these two criteria met, the fragments in the sequence can be taken to be in order and complete for this reassembly session.

Reading out the data for a completed fragment sequence is similar to the process for passing on to the next stage a fragment with the expected sequence number. It should be recalled that passing a fragment to the next stage, either to the ingress queue manager or to the packet/frame builder, is preparatory to transmitting the fragment, or a packet rebuilt from the fragment through the high speed link. Thus, it is the actual data comprising the fragment that needs to be passed on. Given the linked list data structure for storing the fragment data in the external RAM 220, this can easily be done. To pass the fragment and its data, the data must be read from the RAM bank 220. This merely involves traversing the linked list and reading the data in the memory location pointed to by the pointers in the linked list. Once the last link has been traversed and the data read and passed to the next stage, the fragment has effectively been transmitted.

A similar operation to the above is executed when reading out or passing a reordered sequence of fragments from the resequencing module. To transfer the reordered fragments, each of the fragments are sequentially passed to the next stage. The first pointer in the second tier pointer array is read and the linked list pointed to is sequentially read in much the same way as a fragment is read for passing on. Once the first fragment in the sequence is read, the status bits for the pointer entry in the pointer array are reset so the array can be reused. Then, the next fragment is read out from memory in the same manner. Thus, each fragment is sequentially transferred to the next stage by reading its data from the memory until all the fragments in the relevant second tier pointer array are dispatched and the pointer is ready for reuse.

To ensure a continuous stream of properly sequenced fragments, a "roam" operation is periodically executed by the resequencing module. A "roam" operation checks the various reassembly/resequencing sessions to see if any are ready for dispatch. As explained above, this involves just checking the status bits of the second tier pointer array. If, for a specific second tier array, all the OCCUPIED bits are set and the end fragment is present, then that sequence of fragments is ready for dispatch. However, to preserve packet order, the fragment sequence must be one that the packet/frame builder module or one that the ingress queue manager requires. As an example, if the packet/frame builder module has packets A, B, and C currently being reassembled or built, fragment sequences that are not needed by those packets cannot be dispatched. If, on the other hand, a completed fragment sequence will complete packet B, then that fragment sequence can be dispatched or dequeued for passing on to the packet/frame builder. Similarly, if the resequencing module output is to be sent directly to the ingress queue manager, then it may be the sequence number that determines which fragment sequence is to be dispatched or dequeued. As an example, if fragment sequences with sequence numbers x1-x7, x1-x19, and x21-x25 are sequenced properly and ready for dispatch but the ingress queue manager needs fragment x0, then none can be dispatched. Once fragment x0 is received and dispatched, then fragment sequence x1-x7 can be dispatched as it is the next in the numbering sequence. Sequence x10-x19 cannot be dispatched until fragments x8-x9 arrive or are determined to be lost. While the above scheme notes using a two-tier system, implementation using only a single tier is possible. Using only the second tier will allow resequencing of the fragments but this may not allow for large numbers of fragments. Essentially the number of fragments per sequence will be limited to the number of entries in a second tier array. If more entries are required, a first tier can be used, thereby multiplying the number of fragments that can be accommodated by the number of entries in the first tier array.

The example above notes a second tier array for a specific fragment sequence. After a fragment sequence is read out of a secondary tier, this tier is placed in a pool of available arrays for use by other fragments or fragment sequences. Also, while the examples above only show a single fragment sequence in a second tier array, multiple fragment sequences can have a single second tier array. This is evident from the sample formula given above for determining a fragments' placing in a second tier. Since fragments are given different channels, the channel offset value in the formula allows for multiple channels, and hence multiple fragment sequences, to coexist in a single second tier array.

It should be noted that either the header lookup module 240 or the resequencing module 250 can be equipped with the capability of determining whether a specific fragment is to be considered as lost. This loss detection capability can be implemented by executing well-known loss detection methods. These can be as simple as a time-out period for fragments with expected sequence numbers. If the expected fragment does not arrive within a set period of time, the fragment can be declared lost. This capability prevents the system from indefinitely waiting for a fragment that may be lost due to circumstances beyond the system's or a user's control.

The next stage in the system, assuming the output of the resequencing module is not sent directly to the ingress queue manager 270, is the packet/frame builder module 260. This module receives either fragments with the expected number or completed fragment sequences. The packet/frame builder module 260 aggregates fragments and removes the fragment "wrapper" or frame to extract the packet portion. These packet portions are then reassembled to arrive at the completed packet.

To help keep track of which packets are currently being assembled, the packet/frame builder 260 takes note of the reassembly session number of incoming fragments or fragment sequences. It must be recalled that reordered fragment sequences from the resequencing module are reordered or resequenced on a reassembly number basis. Once a reassembly/resequencing operation in the resequencing module is complete (i.e. all fragments from a certain point are present and accounted for), the resulting fragment sequence is ready for dispatch. By merely matching the reassembly session number of the fragment sequence with the reassembly session number of a packet being assembled in the packet/frame building module, the packet can be mated with the rest of its fragments. Thus, when the resequencing module executes a "roam" operation, it is equipped with the reassembly session number of the packets being assembled in the packet/frame module. If a fragment sequence is complete and its reassembly session number matches that of a packet being reassembled, these two are mated and the packet is completed.

Once the packets are assembled in the packet/frame builder module, they are ready for the egress queue manager 270. This queue manager 270 enqueues packets and/or fragments for transmission on the high speed link 50.

While the above describes a system that transmits data from a multilink bundle to a single high speed line, the concepts applied in the above system can equally be used for a transmit system which transmits from a high speed line to a multi-link bundle. A block diagram of such a system is illustrated in FIG. 7.

Figure 7:
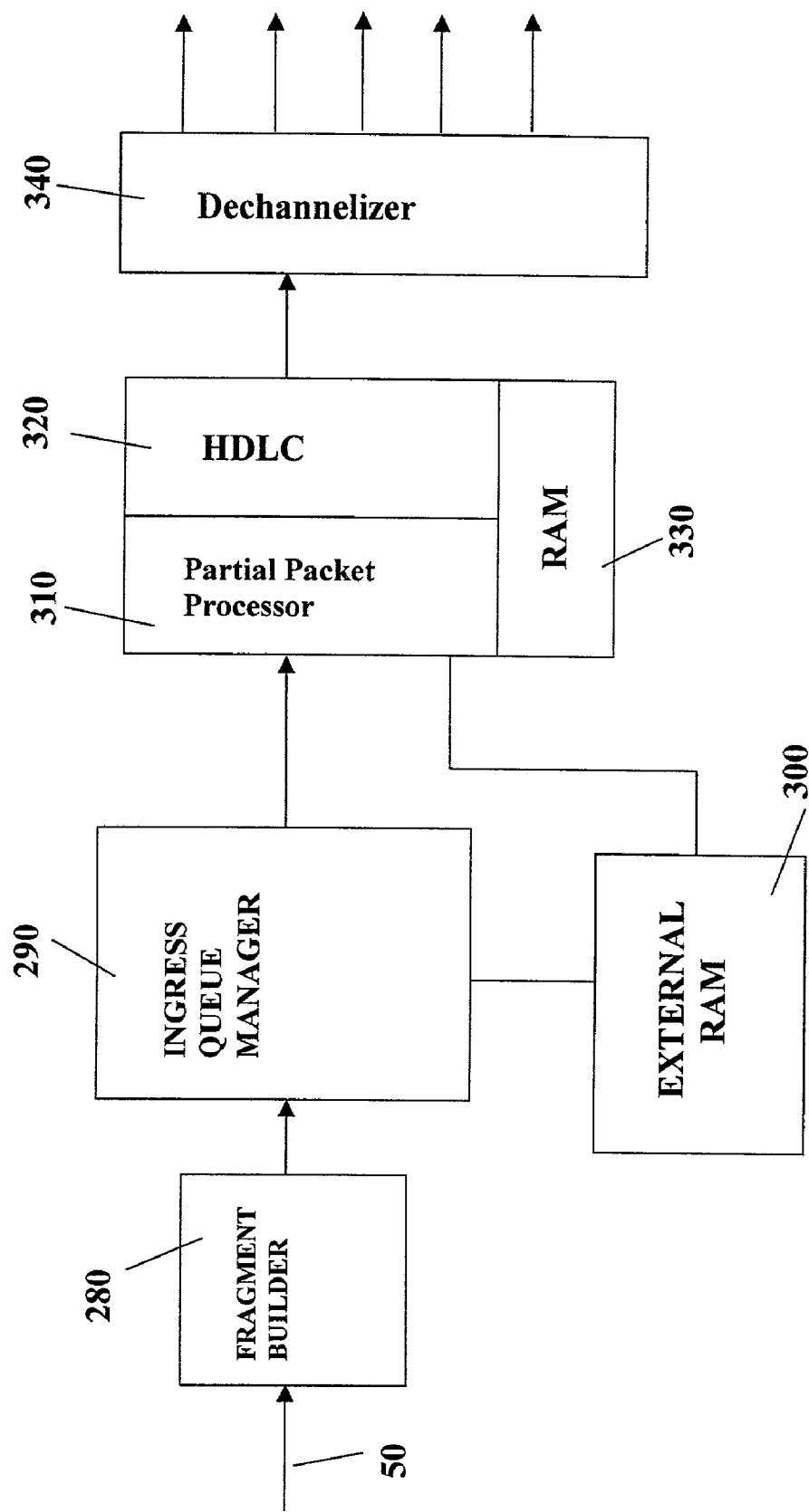
FIG. 7 is a block diagram for a transmit system which transmits from a high speed line to a multilink bundle.

Referring to FIG. 7, the transmit system is comprised of a fragment builder module 280, an ingress queue manager module 290, external RAM 300, a transmit partial packet processor 310 HDLC transmit engine 320, internal RAM 330, and a de-channelizer module 340 which connects to multilink bundle or bundles.

To explain the function of the different components, the fragment builder 280 receives a data stream from the high speed line 50. This data stream is composed of packets and the fragment builder 280 will retrieve the packets from the data stream. Not only that, but the fragment builder 280 will also fragment each packet. Each fragment of each packet will further be decomposed by the egress queue manager 290 into smaller data units analogous to the concept of the "chunk" explained above. Each fragment, once properly created with the proper formatting, headers, and sequence numbers, is placed in the external RAM 300 using the linked list concept explained above. It should also be noted that, at this point, each fragment is assigned a specific channel by the egress queue manager.

With the incoming fragment stored in the external RAM 300 and properly divided into convenient data units ("chunks"), the transmit partial packet processor 310 will then retrieve specific amounts of these data units from the external RAM 300 as required by the transmit HDLC engine. As noted above, the HDLC protocol encapsulates smaller data units for transmission via the multilink bundles.

It should be noted that the internal RAM 330 (usually fast SRAM) is used by the transmit partial packet processor 310 in a similar fashion as the RAM 210 is used by the partial packet processor 200 in FIG. 3. Essentially this internal RAM 330 a temporary storage space for the smaller units of data retrieved from the external RAM 300. The transmit partial packet processor 310 retrieves a set amount of data from the external RAM 300 (say, 32 bytes) and places this in a designated location in the internal RAM 330. When the transmit HDLC engine 320 needs to send data through, the engine 320 or the partial packet processor 310 retrieves some or all the data in a specified location in the internal RAM 330 and encapsulates it in an HDLC frame for transmission.

It should be noted that the storage of data in the internal RAM 330 is, again, similar to that used for the RAM 210 in FIG 3. Specific areas of the internal RAM 330 are set aside for specific channels. Thus, if the transmit HDLC engine 320 needs to send data for channel A then the memory area for that channel is known and segregated.

As an improvement to existing systems, the incoming packets from the high speed link 50 in FIG. 7 may be equipped with a tag or connection identifier. This CI (connection identifier) identifies the multilink bundle and the exact multi-link session associated with the packet. Similar in concept to the reassembly session number assigned to fragments as explained above, the CI allows multiple fragmentation sessions to occur simultaneously.

Returning to the transmit HDLC engine 320, this module receives the byte stream from the transmit partial packet processor 310 and encapsulates or frames the data units with an HDLC header, bit stuffs the frame if required, and appends an FCS (for error correction) trailer to the frame. These HDLC frames are then sent to the de-channelizer for transmission on the multiple links.

Concerning the egress queue manager 290, this module can balance the load among the different links in a bundle. The egress queue manager 290 determines the amount of data that is to be transmitted on each link and determines which link has the least amount of data to be transmitted or the least data fill. An incoming frame or fragment for transmittal is the assigned to this link. The egress queue manager 290 than repeats the process for each incoming frame, assigning the incoming frame to a link that has the least number of bytes to transmit. If all the links have an equal number of bytes to transmit, the de-channelizer can cycle through the links in a round-robin function.

Figure 8:
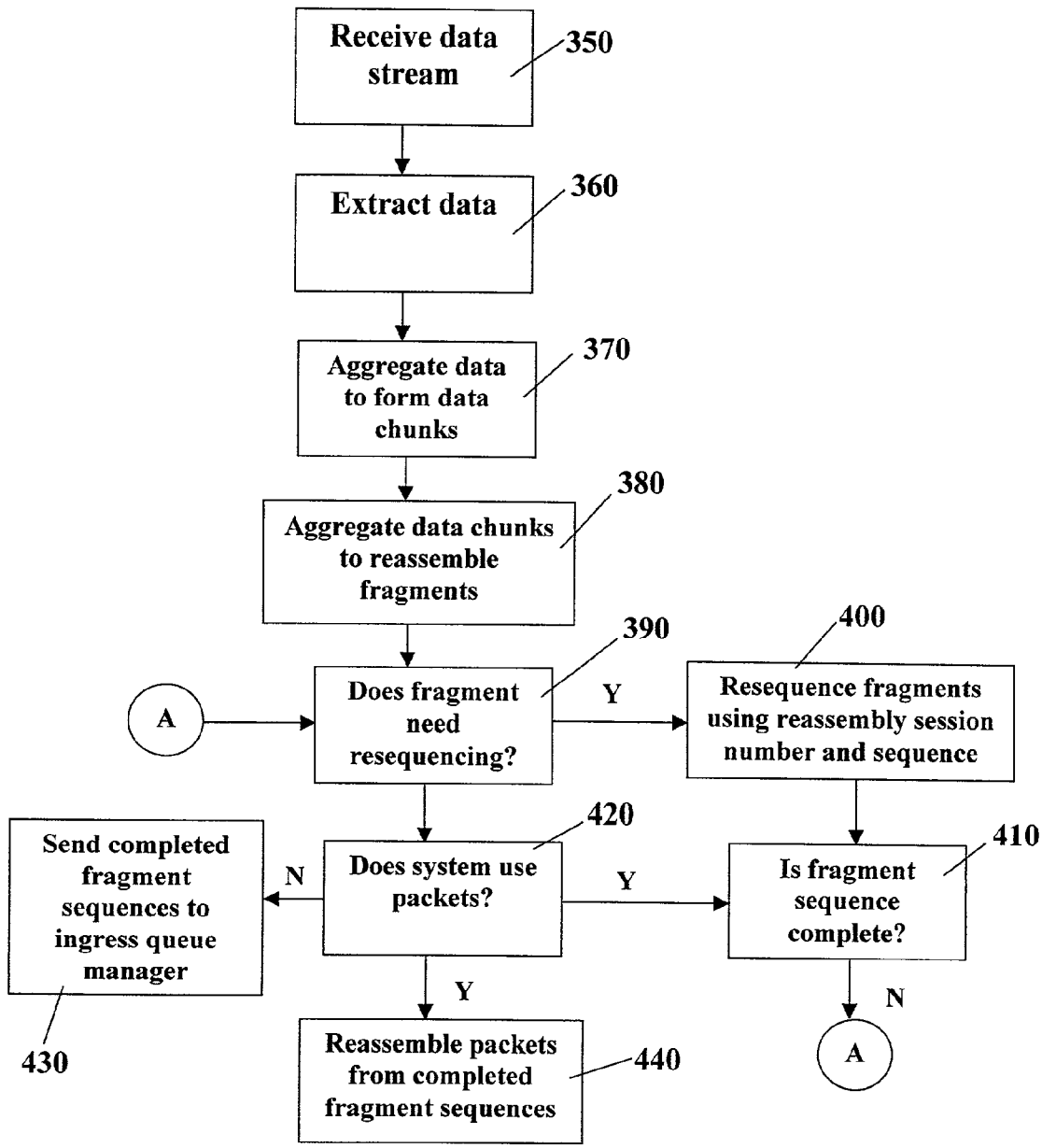
FIG. 8 is a flow chart which illustrates steps in a process executed in by the system illustrated in FIG. 3.

The processes outlined about can be summarized in a few flowcharts for clarity. Referring to FIG. 8, a flowchart illustrates the steps in a process executed by the system in FIG. 3. Requiring with step 350, that of receiving the data stream from the transmit mode, the process is initialized. Step 360 is that of extracting the data contained in the data stream. This data, in the form of HDLC frames, contains the divided fragments. The data is then aggregated to form chunks of data in step 370 using internal RAM banks with memory areas set aside for each channel. In step 380, the data chunks are aggregated to reassemble the fragments. As noted above, the chunks of data are passed from the internal RAM banks to the external RAM and are sorted therein using the linked list data structure explained above.

Once the fragment has been reassembled from the data chunks, step 390 checks if the fragment has to be resequenced relative to the other fragments already received. If the fragment is in need of resequencing, step 400 is that of resequencing the fragment by determining its placement in the sequence using its reassembly session number and its sequence number. Step 410 then determines if the fragment sequence can be sent to the next stage. If the fragment sequence is not complete, then connector A shows that the logic flow returns to step 390 for a new fragment. If, on the other hand, the fragment sequence is complete or the response to the query of step 390 is in the negative, then step 420 checks if the high speed link at the end of the system uses packets or a simple data stream. Clearly, the answer to this step can be preset at the system level. If the packets are not used, then step 430 is that of sending the completed fragment sequence to the ingress queue manager. If packets are used, step 440 is that of reassembling the packets from the completed fragment sequences for eventual transmission to the ingress queue manager.

Figure 9:
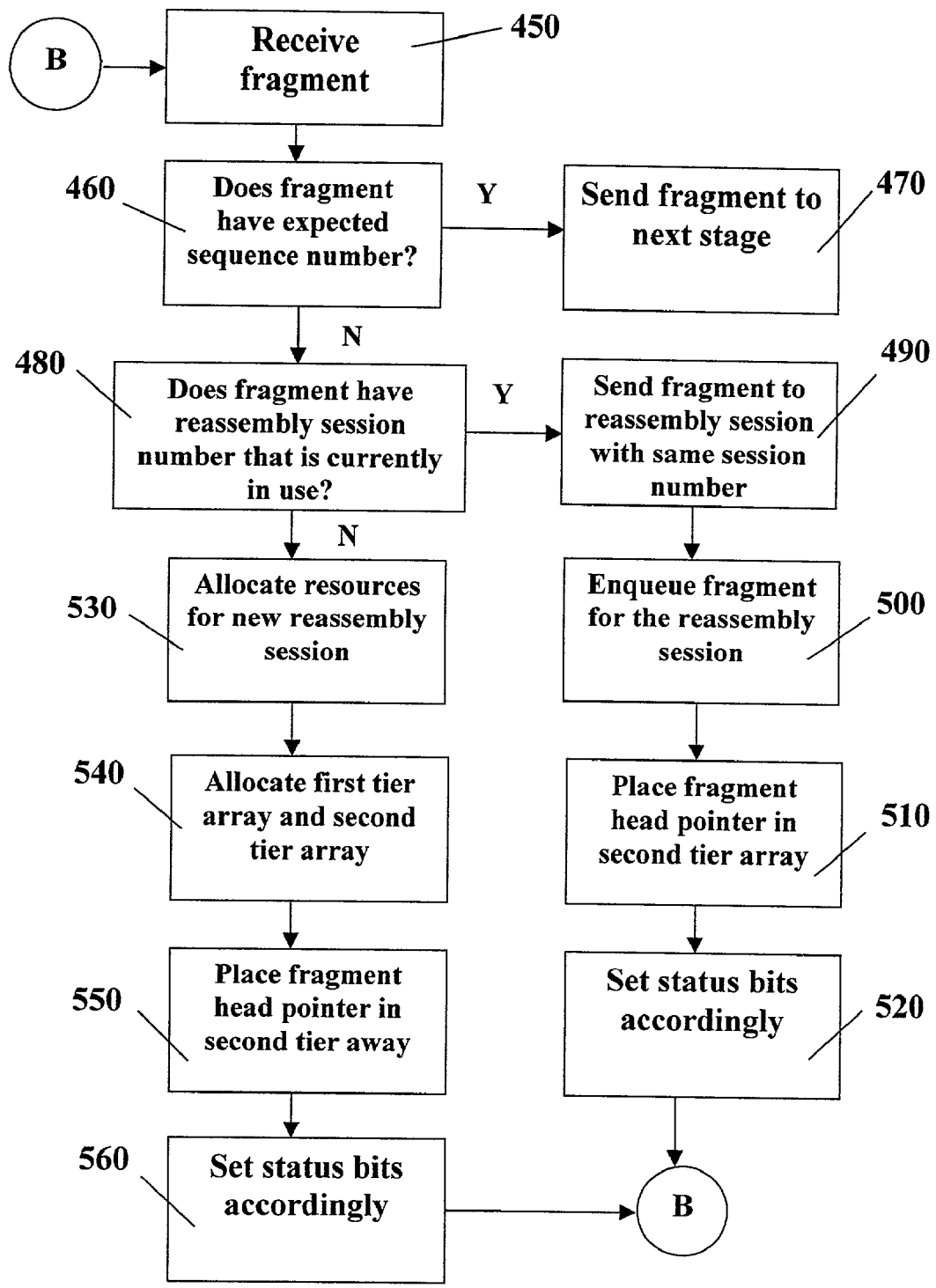
FIG. 9 is a flow chart detailing the steps executed in resequencing a fragment using the two tier data structure illustrated in FIG. 5.

While the flowchart of FIG. 8 presents an overview of the actions of the system in FIG. 3, FIG. 9 details the steps executed in resequencing a fragment using the two tier data structure outlined above. This resequencing process begins at step 450 with the reception of a fragment. Once the fragment has been received, step 460 is determining if the fragment has the expected sequence number. This determines if the fragment is the next expected fragment. If so, then step 470 details sending the fragment to the next stage. If the fragment does not have the expected sequence number, then step 480 queries whether the reassembly session number for the fragment is one that is already in session or in use. If the reassembly session is in use, then step 490 details sending the fragment to the reassembly session with the same session number for resequencing. Step 500 then enqueues the fragment for the reassembly session. Step 510 then places the fragment head pointer (the first pointer for the linked list of memory locations containing the data for the fragment) in the proper slot in a second tier array based on the sequence number. Step 520 then sets the status bits for that end tier array entry accordingly. Connnector B then returns the logic flow to step 450 to receive another fragment.

Returning to decision 480, if the reassembly session number is not currently in use, then step 530 details allocating resources for a new reassembly/resequencing session. This requires allocating a first tier array and, when necessary, at least one second tier array (step 540). The head pointer for the fragment is then placed in the proper slot in the tier array (step 550) and the status bits for this entry are then set accordingly (step 560). Again, connector B details returning the logic flow back to step 450.

Figure 10:
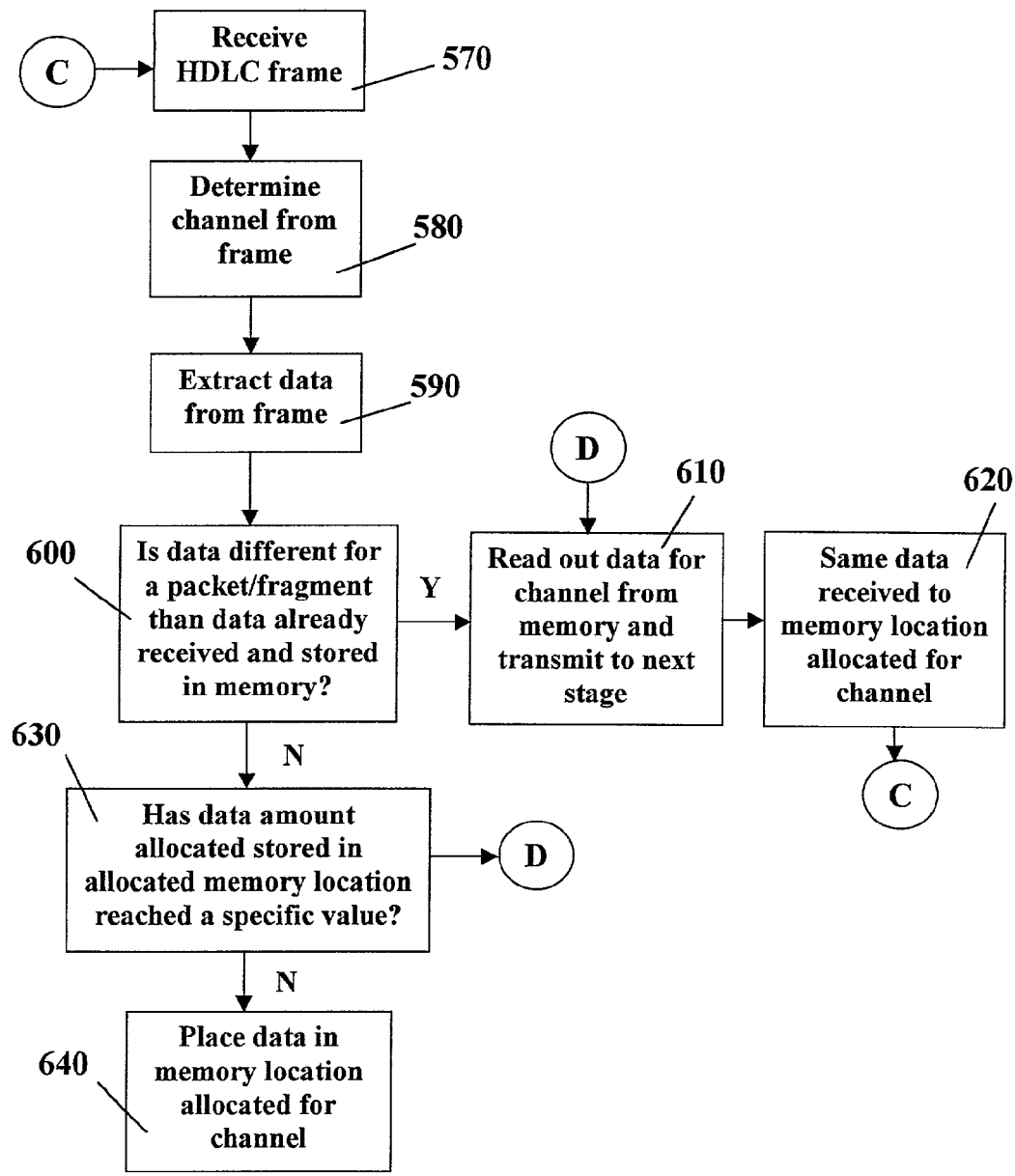
FIG. 10 details steps taken to retrieve data from the data stream.
Figure 11:
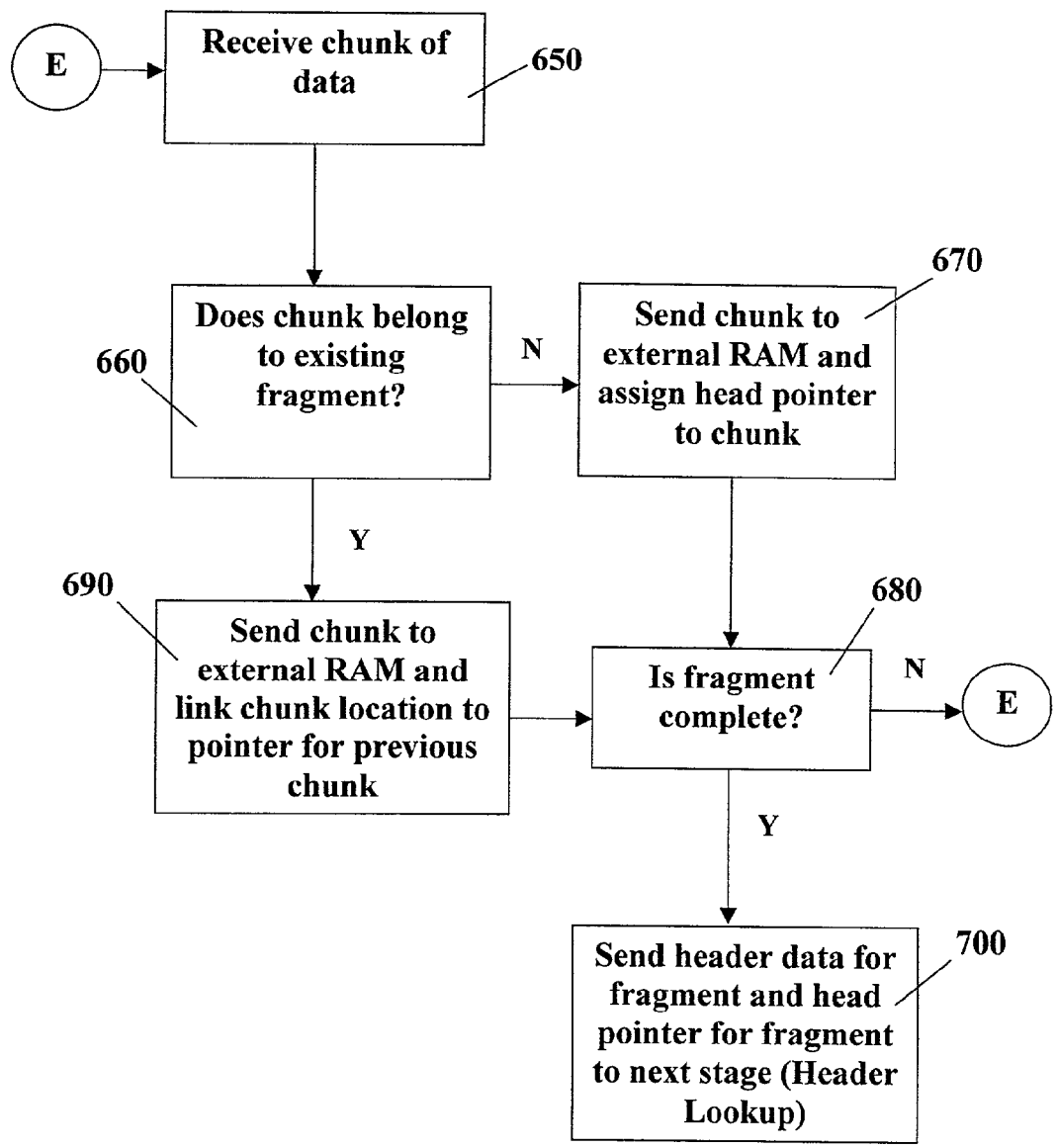
FIG. 11 details the steps involved in reassembling a fragment.

Referring to FIGS. 10 and 11, these two flowcharts detail the steps in the processes which lead to the reassembly of fragments from the datastream received via the multiple links. The flowchart in FIG. 10 recounts the steps taken to retrieve data from the datastream. Step 570 initiates the process with the reception of an HDLC frame from the datastream. The channel associated with the frame is then determined in step 580. The data contained in the frame is extracted in step 590. Step 600 checks if the data received is for a different packet/fragment than the data already saved for that channel in the RAM bank. It should be recalled that specific memory locations and amounts are preallocated for each channel in the RAM bank. If the data received indicates a new packet/fragment, then step 610 reads out the data stored in memory for transmission to the next stage in the system. Step 620 then saves the data received at the memory location allocated for the channel. Connector C then notes that the process begins anew at step 570 with a new HDLC frame.

If the data received is not for a new packet/fragment, then step 630 checks if enough data has been stored to constitute an acceptable chunk of data. If not then step 640 appends the data received to the data stored in memory. If there is sufficient stored data, then connector D shows that the logic then flows to steps 610 and 620.

Referring to FIG. 11, the flowchart details the steps involved in reassembling a fragment. As can be seen, step 650 initiates the process by receiving a chunk of data from the internal RAM. Decision 660 then determines if the received chunk belongs to an existing fragment belonging to a specific channel. If there is no existing fragment, then a new fragment reassembly must be initiated. This is detailed in step 670 in which the received chunk is sent to the external RAM and the head pointer for the newly initiated fragment is assigned to the pointer for the memory location where the received chunk has been saved. This starts a new linked list for this fragment. Step 680 then checks if the fragment is complete. It should be noted that it is possible to have a fragment consisting of only the chunk and this is why the next step checks for fragment completeness.

Returning to decision 660, if the chunk does belong to an existing fragment, then the received chunk is sent to external RAM for storage. A pointer to this location is appended to the linked list that details where in external RAM the separate parts of the fragment are stored. Afterwards, step 680 checks for fragment completeness. If the fragment is complete, then the header data for the fragment and the head pointer for that fragment's linked list is sent to the next stage.

A person understanding the above-described invention may now conceive of alternative designs, using the principles described herein. All such designs which fall within the scope of the claims appended hereto are considered to be part of the present invention.

We claim:

1. A method of reordering packet fragments, said packet fragments being derived from a packet which has been divided Into at least two fragments, each of said at least two fragments having a sequence number denoting a position in a proper sequence for correct ordering of each fragment for a reassembly of said packet, each fragment being represented by a head pointer, the method comprising:
   a) receiving a received head pointer for a received fragment;
   b) determining a sequence number for said received fragment;
   c) determining a first slot position for said received head pointer in a first tier pointer array, said first slot position being determined by the sequence number for said received fragment, said first slot position having a tier pointer pointing to a second tier pointer array;
   d) determining a second slot position for said received head pointer in the second tier pointer array, said second slot position being determined by the sequence number for said received fragments;
   e) placing said head pointer in said second slot position; and
   f) repeating steps a)–e) until a sequence of received head pointers stored in said second tier array indicates a complete sequence,
wherein
a complete sequence is a sequence of head pointers that does not have a gap and includes a fragment that is an end fragment for said packet.

2. A method as in claim 1 wherein said head pointer is a beginning painter in a linked list of pointers, each pointer in said linked list of pointers pointing to a memory location in a random access memory (RAM) bank.

3. A method of reordering packet fragments, said packet fragments being derived from a packet which has been divided into at least two fragments, each fragment having a sequence number denoting a position in a proper sequence for correct ordering of each fragment for a reassembly of said packet, each fragment being represented by a head pointer, the method comprising:
   a) receiving a received head pointer for a received fragment;
   b) determining a sequence number for said received fragment;
   c) determining a slot position for said received head pointer in a pointer array, said slot position being determined by the sequence number for said received fragments;
   d) placing said head pointer in said slot position;
   e) repeating steps a)–d) until a sequence of received head pointers stored in said array indicates a complete sequence,
wherein a complete sequence is a sequence of head pointers that does not have a gap and includes a fragment that is an end fragment for said packet.

4. A method as in claim 3 wherein said pointer array is found by referring to a locator pointer entry in a locator pointer array, said pointer entry being determined by said sequence number for said received fragment.

5. A method as in claim 3 wherein said head pointer is a beginning pointer in a linked list of pointers, each pointer in said linked list of pointers pointing to a memory location in a random access memory (RAM) bank.

6. A method of resequencing packet fragments forming portions of a data packet into a proper sequence for a reassembly of said packet, each fragment having a sequence number denoting a proper placement of said fragment in said reassembly, the method comprising:
   a) receiving a head pointer for a received fragment, said head pointer representing said received fragment;
   b) determining a reassembly session number for said received fragment said reassembly session number denoting a home packet of which said received fragment is a part;
   c) determining if said home packet of which said received fragment is a part is currently being reassembled;
   d) if said home packet is currently being reassembled, determining which pointer array is being used in a reassembly of said home packet and placing said head pointer in said pointer array;
   e) if said home packet is not currently being reassembled, initiating a reassembly of said home packet by allocating a pointer array for said reassembly of said home packet;
   f) determining a slot position for said head pointer in said pointer array, said slot position being determined by the number for said received fragment;
   g) placing said head pointer in said slot position; and
   h) repeating steps a)–g) until a sequence of received head pointers stored in said array indicates a complete sequence,
wherein a complete sequence is a sequence of head pointers that does not have a gap and includes a fragment that is an end fragment for said packet.

7. A method as in claim 6 wherein said pointer array is found by referring to a locator pointer entry in a locator pointer entry in a locator pointer array, said pointer entry being determined by said sequence number for said received fragment.

8. A method of processing data frames in a multiple channel system, said data frames containing a payload, said payload comprising portions of a lamer data transmission unit, the method comprising:
   a) receiving a data frame;
   b) determining with which channel said data frame is associated;
   c) extracting a payload of said data frame;
   d) storing said payload at a memory location specifically associated with said channel;
   e) if previous payloads already stored at said memory location, appending said payload to said previous payloads; and
   f) repeating steps a)–e) until a specific condition is met, said specific condition being chosen from the group comprising:
   an amount of data stored in said memory location reaches a predetermined value; and
   a payload received and data stored in said memory location relate to different data transmission units.

9. A method as is claim 8 further including reading out said data in said memory locations and transmitting said data to a different processing unit when said specific condition is met.

10. A method as in claim 8 wherein said data transmission unit is a data packet used for transferring data in network.

11. A method as in claim 8 wherein said data transmission unit is a fragment containing a portion of a data packet used in transferring data in a network.

12. A method as in claim 8 wherein said memory location is within a static random access memory (SRAM) bank.

13. A system for resequencing packet fragments forming portions of a data packet, each of said fragments having a sequence number denoting a proper placement of said fragment in said reassembly and each of said fragments having a packet session number denoting a home packet of which said fragment is a part of, the system comprising:
    at least one pointer array for each resequencing operation for storing head pointers, each head pointer representing a received fragment, each head pointer being associated with a slot in a pointer array based on the sequence number of a fragment represented by said head pointer; and
    a lookup engine for determining if a fragment represented by a head pointer has a reassembly session number matching a resequencing operation being performed,
wherein
in the event a fragment has a reassembly session number matching a resequencing operation being performed, its head pointer is placed in a pointer array for said resequencing operation.

14. A system as in claim 13 further including at least one locator/pointer array, said at least one locator/pointer array referencing said at least one pointer array such that each entry in a locator/pointer array refers to a pointer array.

15. A system for processing data frames in a multiple channel data transmission system, said data frames containing a payload, said payload comprising portions of a larger data transmission unit, the system comprising:
    a data frame engine for extracting a payload from said data frames;
    a partial packet processor for storing payloads extracted from said data frames;
    an internal memory bank controlled by said processor such that said payloads are stored in said memory bank,
wherein
a specific memory location in said memory bank is allocated for each channel such that payloads from a specific channel are stored in said memory location.

16. A system as in claim 15 wherein if a received payload from a specific channel and previously received payloads stored in said specific memory location allocated said specific channel are from a single larger data unit, said received payload is appended to said previously received payloads.

17. A system as in claim 15 wherein if a received payload from a specific channel and previously received payloads stored in said specific memory location allocated for said specific channel are not from a single larger data unit said previously received payloads are retrieved from said bank and transferred to a next stage and said received payload is stored in said specific memory location.

18. A multiple stage system for processing data stream on a multiple link system, said system comprising:
    a first stage for receiving data frames and extracting and storing payloads from said data frames;
    a second stage for rebuilding fragments from said payloads of said data frames; and
    a third stage for resequencing said fragments for eventual retransmission to a high speed data link,
wherein
each of said fragments forms a portion of a data packet each of said fragments having a sequence number denoting a proper placement of said fragment in said reassembly and each of said fragments having a reassembly session number denoting a home packet of which said fragment is a part.

19. A system as in claim 18 wherein said first stage comprises:
    a data frame engine for extracting a payload from said data frames;
    a partial packet processor for storing payloads extracted from said data frames;
    an internal memory bank controlled by said processor such that said payloads are stored in said memory bank,
wherein
a specific memory location in said memory bank is allocated for each channel such that payloads from a specific channel are stored in said memory location.

20. A system as in claim 18 wherein said second stage comprises:
    a memory bank for storing data chunks, each data chunk being a portion of a fragment;
    a linked list pointer table, said pointer table having a record of which specific memory locations in said memory bank are used by specific data chunks
wherein
each data chunk relating to a specific fragment is stored in a specific memory location, an address of such specific memory location being placed in said pointer table and linked to addresses of previously stored data chunks.

21. A system as in claim 18 wherein said third stage comprises:
    at least one pointer array for each resequencing operation for storing head pointers, each head pointer representing a received fragment, each head pointer being associated with a slot in one of said at least one pointer array based on the sequence number of a fragment represented by said head pointer; and
    a lookup engine for determining if a fragment represented by a head pointer has a reassembly session number matching a resequencing operation being performed,
wherein
if a fragment has a reassembly session number matching a resequencing operation being performed, its head pointer is placed in a pointer array for said resequencing operation.

* * * * *

UNITED STATES PATENT AND TRADEMARK OFFICE
CERTIFICATE OF CORRECTION

PATENT NO. : 7,027,443 B2
APPLICATION NO. : 09/934847
DATED : April 11, 2006
INVENTOR(S) : Stacy William Nichols et al.

It is certified that error appears in the above-identified patent and that said Letters Patent is hereby corrected as shown below:

Column 6, line 21, delete "transmh" and insert therefor --transmit--;

Column 6, line 38, insert -- . -- after "...the original packet";

Column 8, line 53, delete "pllshlng" and insert therefor --plishing--;

Column 17, line 46 (claim 2), delete "painter" and insert therefor --pointer--; and Column 18, line 50 (claim 8), delete "lamer" and insert therefor --larger--.

Signed and Sealed this

Twenty-fourth Day of October, 2006

JON W. DUDAS
*Director of the United States Patent and Trademark Office*